United States Patent Office 2,767,260
Patented Oct. 16, 1956

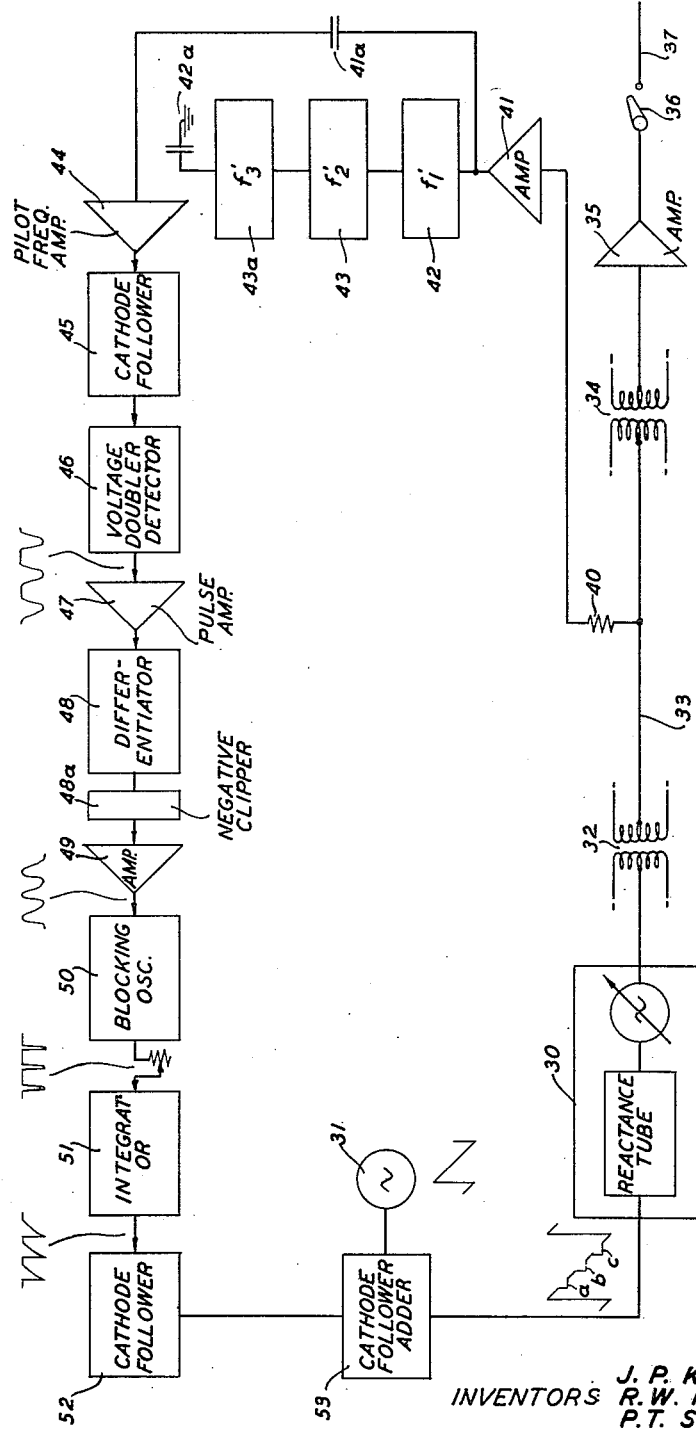

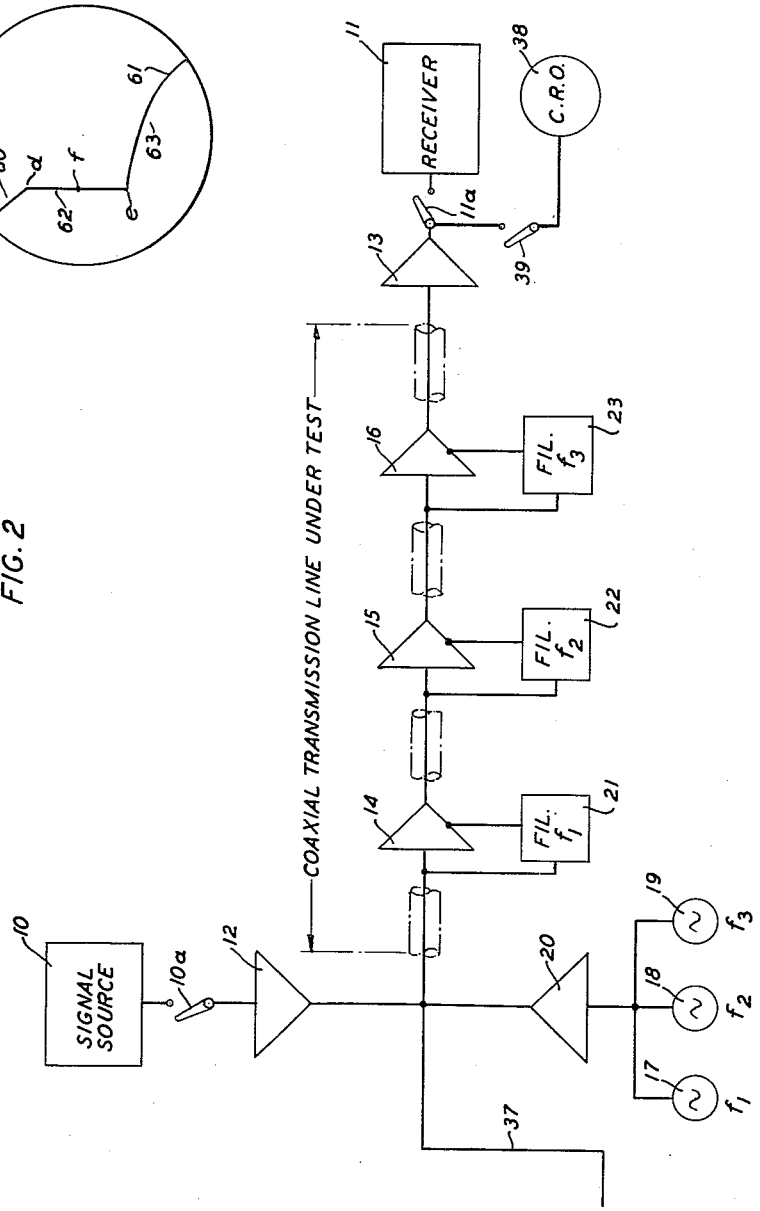

2,767,260

BROAD BAND TESTING CIRCUIT

John P. Kinzer, New Providence, Robert W. Marshall, Summit, and Philip T. Sproul, Chatham, N. J., assignors to Bell Telephone Laboratories, Incorporated, New York, N. Y., a corporation of New York Application January 22, 1954, Serial No. 405,608

14 Claims. (Cl. 179—175.3)

This invention relates to apparatus for measuring gain and/or phase distortion in broad band coaxial conductor transmission systems adapted with frequency-selective pilot-wave control equipments for regulating the gain of repeaters included therein. More specifically, the invention involves measuring apparatus in which test signals utilized to measure such gain and phase distortion are precluded from impairing the normal transmission regulation of such repeaters by the pilot-wave control equipments.

It is known in the signal transmission art to utilize a coaxial conductor system for transmitting signals over a broad band of operating frequencies, say, for example, a frequency band extending from 50 kilocycles through 10,000 kilocycles. Such system usually comprises a plurality of spaced repeaters for controlling transmission therein and a group of pilot waves applied to the system at a main station and having different frequencies all of which are included in its operating frequency range. Certain of the repeaters are adapted to have their gain regulated by frequency-selective control equipments activated by pilot waves of predetermined frequencies. As such systems may extend to a length of the order of several hundred miles or longer, it is necessary to employ test signals from time to time to measure certain electrical characteristics of the system in order to ascertain whether it is operating within tolerable limits of such characteristics. Usually the test signals are periodically swept over frequency ranges substantially coextensive with given operating frequency ranges of the system. In such event, it has been found that test signals having frequencies lying in the frequency regions of the pilot frequencies tend to augment the pilot-wave response of the control equipments thereby resulting in unnecessary operations of the line repeaters to regulate transmission in the system.

The present invention contemplates a circuit for measuring the gain and/or phase distortion of a broad band signal transmission system subject to pilot-wave regulation.

It is the main object of the invention to measure an electrical characteristic of a broad band signal transmission system without interfering with the normal regulation thereof by pilot-wave control equipments.

It is another object to vary the time-rate of the sweep of different frequency portions of test signals applied to a broad band signal transmission system in order to avoid impairment of the pilot-wave regulation thereof.

It is a further object to measure an electric characteristic of a broad band signal transmission system by sweeping test signals of preselected frequencies in operating frequency ranges, co-extensive with a part or all of said signal broad band, at different time-rates in such manner that test signals having frequencies lying in the frequency regions of pilot waves are swept at the higher time-rate to obviate unnecessary pilot-wave regulation of the system.

It is another object to shorten the time intervals during which test signal energy having frequencies lying in the frequency regions of pilot waves is available to pilot-wave transmission regulating equipments during the sweep of test signals over a frequency range covering a part or all of the operating frequency band in a broad band signal transmission system.

It is another object to increase the time-rate of the sweep of test signals through preselected frequency bands each of which includes a frequency equivalent to one of the pilot waves utilized to regulate transmission in a broad band signal system.

It is another object to skip test signals having frequencies lying in the frequency regions of pilot waves through the latter frequency regions at such time-rate as to reduce substantially the amount of test signal energy available to pilot-wave control equipments during the sweep of the test signals through a preselected frequency band which includes frequencies equivalent to the pilot-wave frequencies.

A known type of broad band coaxial conductor signal transmission system includes a plurality of geographically spaced repeaters whose gain is regulated by control equipments which include filters having predetermined pass bands for selecting energizing pilot waves of preselected frequencies. A familiar type of test circuit connectable to the coaxial system is adapted to measure a predetermined electrical characteristic thereof such, for example, as gain and/or phase distortion. Such test circuit may comprise a reactance-tube controlled oscillator whose output is periodically swept over a preselected frequency range to provide test signals for measuring the predetermined characteristic of the coaxial system. The reactance-tube oscillator is activated periodically by a sawtooth voltage in such manner as to sweep the test frequencies at a normal time-rate over the preselected range. In the foregoing, it is apparent that test signal energy having frequencies equivalent to those of the pilot waves would tend to energize the pilot-wave control equipments and thereby effect unnecessary regulation of the system repeaters.

In association with the foregoing coaxial system and test circuit, the present invention contemplates a circuit which utilizes test signals having frequencies lying in the frequency regions of the pilot waves to produce a series of voltage pulses, each corresponding to one test signal frequency lying in the frequency region of one pilot wave. These pulses are added to the sawtooth voltage to produce a plurality of steps therein, each step activating the reactance-tube oscillator in such manner as to sweep the output frequency thereof through a plurality of preselected bands at a time-rate substantially increased above the normal time-rate sweep of other test signal frequencies, and each such swept band including a frequency equivalent to one of the pilot-wave frequencies. Such increased time-rate sweep of the preselected bands of test signal energy reduces the time interval during which such energy is available to the filters of the respective pilot-wave control equipments in the same order of magnitude as the increase in the time-rate of the frequency sweep. For example, if the time-rate sweep of the preselected bands of test signals were increased to the order of 100-times faster than the time-rate of the normal sweep of other test signal frequencies, then the test signal energy corresponding to the increased test frequency sweep would be available in the pass bands of the filter in the respective pilot-wave control equipments for a time interval which would be $\frac{1}{100}$ as long as the time interval corresponding to the normal time-rate sweep of the other test signal frequencies. As a consequence of such extremely shortened time interval, very little test signal energy having frequencies lying in the frequency regions of the pilot waves would pass into the filters of the pilot-wave control equipments. Hence, the little amount of test signal energy effective in the pilot-wave control equipments would tend to augment to a negligible extent the regulatory effect of the pilot waves on the transmission characteristic of the coaxial system.

The present invention is also contemplated for use with a one-hop radio signal transmission system which is operated over a broad band of signal frequencies and which includes one or more sources of pilot waves sent out from a transmitter and utilized at a receiver for regulating the gain of one or more repeaters thereat. In such instance, the test signals are skipped through frequency regions lying in proximity of those of the pilot waves in order to preclude test signal energy of such frequencies from augmenting the pilot-wave energy and thereby interfering with the normal regulatory effect of the pilot waves on the system repeaters.

The invention will be readily understood from the following description when taken together with the accompanying drawings in which:

Figs. 1 and 2 constitute a block diagram illustrating a specific form of the invention embodied in a known type of coaxial signal transmission system adapted with a familiar type of measuring circuit; and Fig. 3 is a fragmentary view of action obtainable in the circuit of Fig. 1.

As shown in Fig. 2, it is well known to utilize a coaxial transmission line to connect a signal source 10 located at one geographical point to signal receiver 11 located at a different geographical point through amplifiers 12 and 13, respectively; and to include one or more repeaters 14, 15 and 16 in such line. Suitable switches 10a and 11a control the connection of the signal source and receiver, respectively, to the coaxial line. A typical coaxial transmission line of the foregoing type is disclosed in Affel-Espenshied Patent No. 1,835,031 issued December 8, 1931. As the signal source may be effective, for example, over a complete operating frequency range of 50 kc. through 10,000 kc. or a preselected portion thereof, and as the distance from the signal source to the receiver may be several hundred miles or longer, regulation of transmission on the line at the several repeaters is desirable. This, for the purpose of the present explanation, is achieved by sources 17, 18 and 19 which supply alternating current pilot waves $f_1$, $f_2$ and $f_3$, respectively, through an amplifier 20 to the sending end of the line. The pilot waves are usually included in and suitably spaced throughout the frequency range of the transmitted signals. Frequency-selective control equipments 21, 22 and 23 connected to repeaters 14, 15 and 16, respectively, derive the pilot waves $f_1$, $f_2$ and $f_3$ from the line and utilize them to regulate the gain of the respective repeaters. In coaxial transmission systems of a more complex type, certain repeaters may be controlled by all pilot waves. It will be understood that each frequency-selective control equipment includes a filter, not shown, adapted to select a pilot wave of at least one frequency. Although the use of three pilot-wave sources and three pilot-wave control equipments is indicated, it will be understood that the number of pilot waves of different frequencies depends on the width of the operating frequency band effective on the coaxial system at a given time, the length of the coaxial system and the number of repeaters included therein. For the complete operating frequency band above mentioned, the pilot waves may comprise the following frequencies in kilocycles: 308; 556; 2064; 3096; 7266; and 8320. Obviously, fewer pilot waves may be required as changes are made in the above-noted features of the overall coaxial system. A typical equipment for achieving such regulation on a coaxial transmission line is disclosed in Blair Patent No. 2,100,375 issued November 30, 1937.

As illustrated in Fig. 1, signals for measuring gain or phase distortion, or other electrical characteristics of the foregoing coaxial transmission line, are provided by a reactance-tube controlled oscillator 30 whose output frequency is swept over a preselected operating frequency range by a sawtooth voltage furnished by generator 31. One type of such oscillator suitable for providing the test signals is disclosed in the patent of F. R. Dennis, No. 2,486,265, issued October 25, 1949. The frequency range of the test signals is usually equivalent to the particular frequency range for a given operation of the coaxial system, and may include part or all of the complete operating frequency range of the system. The reactance-tube oscillator is connected through transformer 32, circuit 33, transformer 34, amplifier 35, switch 36 and lead 37 to the signal-source end of the coaxial system shown in Fig. 2. A suitable indicator 38 such, for example, as a cathode ray oscilloscope is connectable via switch 39 to the receiver end of the coaxial system. It will be obvious that when the reactance-tube oscillator and CRO indicator are connected to the coaxial system, the signal source and receiver are disconnected therefrom, and vice versa.

Generator 31 in Fig. 1 provides a sawtooth voltage varying, for example, at 74 cycles per second and serving to activate the reactance-tube oscillator and thereby sweep the output frequency thereof at that periodicity at a linear or normal time-rate over the given operating frequency range of the coaxial system. In addition to the normal time-rate sweep, it will be understood that the reactance-tube oscillator provides the test signals with such magnitude as to produce a predetermined electrical characteristic of the coaxial system on the CRO indicator. From the foregoing, it is apparent that the test signals would include on or more frequencies equivalent to one or more of the pilot-wave frequencies $f_1$, $f_2$ and $f_3$, and that the latter test signal frequencies would be selected by the filters of the associated frequency-selective control equipments and thereby tend to augment the regulatory effect of the pilot waves on the respective coaxial repeaters. In other words, the levels at the respective pilot waves would be raised by the test signals for an instant as the latter signals are swept through frequencies equivalent thereto. This would be corrected for by the pilot-wave control equipments and line repeaters; and an instant later, those equipments and the line repeaters would be required to correct for the level of the pilot waves when they return to normal, i. e., after the test signals had been swept through frequencies equivalent to the pilot frequencies. Since this would happen each time the test signal frequencies were swept through the corresponding pilot-wave frequencies, i. e., at the cyclical rate of 74 times per second, it would result in the introduction of considerable "jitter" in the coaxial system. This would tend to impair the accuracy of the system characteristic displayed on the CRO indicator.

In accordance with the present invention, a circuit is provided to modify the sawtooth voltage of generator 31 in such manner that the time-rate sweep of the test signal frequencies lying in the frequency regions of the pilot-wave frequencies $f_1$, $f_2$ and $f_3$ is substantially increased relative to the normal time-rate sweep of the remainder of the test signal frequencies. This tends to reduce the amount of test signal energy selected by the filters of the pilot-wave control equipments and thereby to minimize the augmentation effect of such test signal energy on the regulation of the coaxial line repeaters in a manner which will be presently explained.

The circuit of the invention shown in Fig. 1 as connected in bridge of test signal circuit 33 comprises in sequence a resistor 40 and an amplifier 41 whose plate circuit, not shown, is tuned by frequency selective networks 42, 43 and 43a to be anti-resonant to preselected test signal frequencies $f'_1$, $f'_2$ and $f'_3$, respectively, which are related to the pilot frequencies $f_1$, $f_2$ and $f_3$ in a sense which will be pointed out subsequently. Thus, the frequency selective networks are provided with such frequency characteristics as to present high impedance to ground 42a for the test signal frequencies $f'_1$, $f'_2$ and $f'_3$ to which they are anti-resonant and low impedance to ground for all other test signal frequencies. As a consequence, the output voltage of amplifier 41 is high for the test signal frequencies $f'_1$, $f'_2$ and $f'_3$ and low for all other test signal frequencies; and the high output voltage of amplifier 41 is applied via condenser 41a to the input of amplifier 44. It will be understood that each of the frequency-selective networks includes a suitable switch, not shown, for causing a short circuit thereof to ground 42a whereby the effects of individual test signal frequencies $f'_1$, $f'_2$ and $f'_3$ can be disabled without interfering with the effects of others.

From the output of amplifier 44, the test signal energy corresponding to the frequencies $f'_1$, $f'_2$ and $f'_3$ is then fed through cathode follower 45 to a voltage-doubler detector 46 which produces a plurality of pulses of negative polarity as shown by the waveform at the output of the latter detector. These negative pulses have their troughs or maximum amplitudes occurring at the instants when the test signals are being swept through the respective frequencies $f'_1$, $f'_2$ and $f'_3$. Also, these negative pulses are transmitted through amplifier 47 which produces large positive pulses which are then supplied through differentiator 48 and negative clipper 48a to amplifier 49 whose output includes a plurality of pulses of positive polarity as shown by the waveform in the output thereof. Each of the positive pulses in the output of amplifier 49 corresponds to one of the above-mentioned pulses in the output of detector 46, and has its leading edge occurring at the instant when the test signals are being swept through the corresponding frequencies $f'_1$, $f'_2$ and $f'_3$ irrespective of the exact amplitudes of the pulses in the output of detector 46. Each of the pulses in the output of amplifier 49 serves to trigger a "one-shot" blocking oscillator 50 which produces a negative pulse of large amplitude and very brief duration as indicated by the waveform at the output of the latter oscillator.

The pulses produced by the blocking oscillator are coincident in time with the sweep of the test signals through the frequencies $f'_1$, $f'_2$ and $f'_3$, and are independent in their amplitudes of the precise characteristics of the pulses in the output of amplifier 49. Next, the blocking oscillator pulses are passed through an integrating network 51 which produces a negative voltage having a substantially vertical wavefront shown in the waveform at the output of the latter network and serving a purpose that will be pointed out subsequently. This voltage is then passed through cathode follower 52 to constitute one input for a cathode-follower adder 53 for which a second input comprises the aforementioned sawtooth voltage of generator 31. Those two input voltages are added in such manner that the sawtooth voltage of generator 31 is provided with a plurality of steps as shown by the waveform in the output of the adder 53. An enlargement of one step is illustrated in Fig. 3 which shows linear sloping portions 60 and 61 of the sawtooth voltage of generator 31 to which is added one voltage waveform at the output integrator 51 to constitute a relatively long section 62 extending substantially vertically downwardly from linear portion 60, and a portion 63 gradually sloping to the right into coincidence with the linear portion 61. The spacing of the steps in the sawtooth voltage depends on the number and spacing of the pulses occurring in the output of integrator 51. Thus, the sawtooth voltage of generator 31 is modified to include a plurality of steps, $a$, $b$ and $c$, each corresponding to one of the test signal frequencies $f'_1$, $f'_2$ and $f'_3$, and having the spacing between successive steps corresponding to the positions of such frequencies in the swept band of test signal frequencies provided by the reactance-tube oscillator.

Referring to Fig. 3, the vertical portion 62 of each step commences at point $d$ which occurs as the test signals are swept through one of the frequencies $f'_1$, $f'_2$ and $f'_3$; and continues vertically downwardly to point $e$ which corresponds to a frequency change through a band $\Delta f$. This continues irrespective of other adjustments in the overall test circuit such, for example, as changes in the operating frequency range thereof. Accordingly, the test signal frequencies $f'_1$, $f'_2$ and $f'_3$ are preselected at frequencies $$\frac{\Delta f}{2}$$

below the pilot-wave frequencies $f_1$, $f_2$ and $f_3$, respectively. In other words, the test signal frequencies are preselected with the following values:

$$f_1' = f_1 - \frac{\Delta f}{2}$$

$$f_2' = f_2 - \frac{\Delta f}{2}$$

and $$f_3' = f_3 - \frac{\Delta f}{2}$$

Thus, the vertical portion 62 of each step is centered at point $f$ which corresponds to one of the pilot-wave frequencies $f_1$, $f_2$ or $f_3$; and causes the reactance-tube oscillator to sweep at an increased time-rate from a frequency which is $$\frac{\Delta f}{2}$$

below the frequency of each pilot wave to a frequency which is $$\frac{\Delta f}{2}$$

thereabove. In the event that the coaxial system under test includes pilot waves of more than three discrete frequencies, it will be apparent that each such additional pilot frequency can be related to a band of test signal frequencies in the manner above explained.

In the operation of the circuit of Figs. 1 and 2, let it be assumed for the purpose of the present explanation that the system illustrated therein is initially conditioned to disconnect the signal source and receiver from the coaxial systems and to have the test signal equipment including the CRO indicator operatively corrected thereto. Further, let it be assumed that the slope of each cycle of the modified sawtooth voltage at the output of adder 53 decreasing from left to right causes the reactance-tube oscillator to provide test signals varying at a linear or normal time-rate over a preselected operating frequency range which includes the frequencies $f'_1$, $f'_2$ and $f'_3$; that the vertical portions between adjacent sloping portions constitute fly-back intervals; and that the coaxial system is operating over a frequency range which requires pilot waves $f_1$, $f_2$ and $f_3$ as abovementioned. When the modified sawtooth voltage reaches step $a$ in Fig. 1, the vertical portion 62 in Fig. 3 sweeps the frequency of the reactance-tube oscillator at the increased time-rate through the band $\Delta f$. Assuming for the present explanation that the band $\Delta f$ comprises 100 kilocycles, then the reactance-tube oscillator is caused to sweep at the increased time-rate from 50 kilocycles below each pilot-wave frequency $f_1$, $f_2$ or $f_3$ to 50 kilocycles thereabove. Thus, the test signals are swept at the increased time-rate through preselected frequency bands each of which has a middle frequency equivalent to one of the pilot-wave frequencies $f_1$, $f_2$ or $f_3$; or in other words through bands of frequencies lying in the frequency regions of the respective pilot waves.

Also assuming for the present explanation that the foregoing increased time-rate sweep of the test signal frequencies is of the order of 100-times faster than the normal time-rate sweep of the remainder of the test signal frequencies, then the test signal energy corresponding to increased test frequency sweep would be available in the pass-bands of the filters included in the pilot-wave control equipments for a time interval which would be 1/100 as long as the time interval corresponding to the normal time-rate sweep of the remainder of the test signals. Now, assuming each of such filters has a 2 kilocycle pass band centered at one of the pilot-wave frequencies $f_1$, $f_2$ or $f_3$, then it would be apparent that very little test signal energy lying in the frequency regions of the respective pilot frequencies would be available to the pilot filters during the time interval corresponding to the increased time-rate sweep. Hence, very little test signal energy having frequencies lying in the frequency regions of the pilot frequencies would pass through the pilot filters into the pilot-wave control equipments connected therewith; and as a consequence such test signal energy as would pass through those filters would tend to augment to a negligible extent the normal effect of the pilot waves on the respective line repeaters for controlling transmission in the coaxial system. The increased time-rate sweep of the test signal frequencies is determined on such a basis that the amount of energy corresponding thereto and passing into the pilot-wave filters is insufficient to affect the normal pilot-wave regulation of the line repeaters.

Assuming in the foregoing that the normal sweep of the test signals involves a time-rate of 0.5 kilocycle per microsecond, then the test signal energy would be available in the 2 kilocycle pass bands of the pilot-wave filters for a time interval of approximately 4 microseconds. However, at the above assumed increased time-rate sweep of the test signals at 100-times faster than the normal time-rate sweep, then test signal energy corresponding to the increased sweep would be available in the pass bands of the pilot-wave filters for a time interval of 4/100 microsecond. In such short time interval, it is apparent that a very small amount of test signal energy passing through the respective pilot wave filters into the associated pilot-wave control equipments would tend to augment to a negligible degree the normal regulatory effect of the pilot waves on the line repeaters. Thus, the amount of test signal energy having frequencies lying in the frequency regions of those of the pilot waves and available to selection by the filters included in the respective pilot-wave control equipments is reduced in the same order of magnitude as the increase in the time-rate sweep of such test signal frequencies. As a consequence, it is possible to preclude any tendency of test signal energy having frequencies lying in the frequency regions of the pilot wave frequencies from introducing "jitter" into a coaxial signal transmission system under test thereby enabling the measurement of a preselected electrical characteristic thereof in a manner unimpaired by any tendency of test signal energy to bring about unnecessary regulation of transmission in the system as hereinbefore explained.

In regard to the numerical values of certain circuit parameters assumed to facilitate the explanation as above indicated, it will be understood that such values can be varied to suit the operational requirements of given circuits. Further it will be understood that the waveforms shown in Fig. 1 are not drawn to scale but are provided merely as an aid in comprehending the explanation.

While the invention has been described in connection with a coaxial signal transmission system it will be apparent to those skilled in the art that various other modifications may be made therein without departing from the spirit and scope thereof, and further in this connection that it will be understood that the invention is equally applicable to a one-hop radio signal transmission system including pilot waves sent out from a transmitter and utilized in a receiver to control repeaters therein, thereby to regulate transmission in the latter system. In such radio systems, test signals having frequencies lying in the frequency regions of the pilot waves and transmitted in the system for the purpose of measuring a preselected electrical characteristic thereof are precluded from impairing the operation of the repeaters and thereby from effecting undesired transmission regulation of the system in the manner explained above in regard to the invention described in connection with Figs. 1, 2 and 3. Accordingly, it will be also understood that the invention is to be limited only by the scope of the appended claims.

What is claimed is:

1. A system for transmitting intelligence over a certain frequency band comprising repeaters for regulating transmission in said system, means for generating pilot waves of different frequencies included in said certain band, frequency-selective control equipments energized by said pilot waves for controlling said repeaters, means to apply to said system test signals swept periodically at a normal time-rate over a frequency range co-extensive with a portion or all of said certain band for measuring an electrical characteristic of said system, and means responsive to test signals having frequencies substantially equivalent to said pilot-wave frequencies for activating said test signal means to increase the frequency sweep of the last-mentioned signals to a time-rate above the normal time-rate whereby the time interval during which the amount of test signal energy available to said equipments is reduced in the same order of magnitude as the increase in the time-rate sweep on each occasion said test signals are swept through said co-extensive frequency range.

2. A system for transmitting intelligence over a broad band of frequencies comprising repeaters for regulating transmission in said system, means for generating pilot waves of different frequencies equivalent to certain frequencies in said broad band, means for energizing said repeaters, said last-mentioned means including a filter connected to each repeater to select a pilot wave of at least one frequency for controlling said last-mentioned repeater, means to apply test signals of variable frequency to said system, means to produce a cyclically varying voltage for energizing said signal means to sweep periodically the frequency thereof at a normal time-rate over a band co-extensive with said portion or all of said broad band and including frequencies equivalent to said pilot waves, means activated by test signals transmitted on said system for measuring an electrical characteristic thereof, and means responsive to test signals having frequencies lying in the frequency regions of said pilot frequencies for modifying the cyclically varying voltage produced by said energizing means in such manner as to combine another voltage with the last-mentioned voltage and thereby vary the frequency sweep of said signal means at a time-rate substantially faster than said normal time-rate, said faster time-rate sweep causing the test signal energy resulting therefrom to be available to the respective pilot filters for time intervals substantially less than the time intervals corresponding to the normal time-rate sweep of the test signals whereby the test signal energy resulting from the faster time-rate sweeps and passing into the respective pilot-wave filters tends to augment the control of said repeaters to a negligible degree.

3. The transmission system according to claim 2 in which said signal responsive means comprises means to generate voltage pulses each time said signal means is swept through said co-extensive frequency band, each of said last-mentioned pulses corresponds to a test signal frequency differing by a predetermined numerical value from one of said pilot frequencies, and means for adding said group of pulses to the voltage of each cycle of said cyclically varying voltage to cause said increased time-rate sweep of said signal means.

4. The signal transmission system according to claim 2 in which said signal responsive means comprises means to generate voltage pulses corresponding in number to the number of pilot frequencies each time said test signal means is swept in frequency through said co-extensive band, and means for combining said voltage pulses with said cyclically varying voltage to effect said increased time-rate sweep of said signal means.

5. The transmission system according to claim 2 in which said signal responsive means comprises a plurality of networks each of which is anti-resonant to a frequency which is less by a predetermined numerical value than the frequency of one of said pilot waves, means to generate voltage pulses, each of said anti-resonant networks is coupled to said generating means whereby said generator provides one voltage pulse each time said signals are swept in frequency through the frequencies for which said last-mentioned networks are anti-resonant, and means for combining said voltage pulses with the voltage of each cycle of said cyclically varying voltage to enable said voltage pulses to sweep the frequencies of said signals at the increased time-rate.

6. The transmission system according to claim 2 in which said signal responsive means comprises a plurality of networks each of which is anti-resonant to a frequency which differs by a predetermined numerical value from one of said pilot frequencies, said anti-resonant networks produce voltages each time the test signals are swept through frequencies for which said last-mentioned networks are anti-resonant, means to utilize the output voltages of said anti-resonant networks for producing voltage pulses corresponding in number to the number of said pilot frequencies, and means for adding said voltage pulses to the voltage of each cycle of said cyclically varying voltage whereby said voltage pulses are enabled to sweep the frequency of said signals at the increased time-rate.

7. The transmission system according to claim 2 in which said signal responsive means comprises a plurality of networks each of which is anti-resonant to a frequency which is less by a predetermined numerical value than one of said pilot frequencies, each of said last-mentioned networks produces a voltage each time the test signals are swept through frequencies for which the respective last-mentioned networks are anti-resonant, blocking-oscillator means activated by the output voltages of said anti-resonant networks to produce uni-directional voltage pulses having substantially vertical wavefronts of equal length and corresponding in number to the number of pilot frequencies, means for combining said voltage pulses with the voltage of each cycle of the cyclically varying voltage whereby the vertical wavefronts energize said signal means to sweep the frequencies thereof at the increased time-rate over frequency bands equal to twice said last-mentioned predetermined frequency value, and each of said last-mentioned bands has a middle frequency equivalent to one of said pilot frequencies.

8. An intelligence transmission system operating over a preselected broad frequency band and including repeaters for regulating transmission in said system, means for providing pilot waves having different frequencies lying within said broad band, means responsive to said pilot waves for controlling said repeaters, means including a variable frequency oscillator to apply test signals to said system for measuring an electrical characteristic thereof, said test signals having an operating frequency band comparable with said broad frequency band, a device for varying the frequency of said oscillator through said comparable band, and means for periodically activating said device to vary the frequency of said oscillator at two different time-rates, said last-mentioned means being responsive to test signals having frequencies differing from said pilot frequencies by a preselected numerical value to activate said device and thereby vary the frequency of said oscillator at the higher time-rate through predetermined frequency bands including said pilot frequencies on each occasion the test signal frequencies are varied through said comparable frequency band, the test signal energy corresponding to said predetermined frequency bands tending to exert substantially no influence on the pilot-wave control of said repeaters.

9. The system according to claim 8 in which said activating means comprises means to produce a sawtooth voltage varying at a preselected cyclical rate for activating said device to vary the frequency of said oscillator at a normal time-rate over said comparable frequency band, and means responsive to said test signals having frequencies differing from said pilot frequencies by said preselected numerical value to produce voltage pulses corresponding in number to the number of pilot frequencies each time the test signals are varied through said comparable band, means to add said voltage pulses to the voltage of each cycle of said sawtooth voltage for producing a stepped sawtooth voltage, each step of which serves to activate said device and thereby vary the frequency of said oscillator at the higher time-rate through one of said predetermined frequency bands which is substantially equivalent to twice said preselected numerical value.

10. In a system for transmitting intelligence over a broad band of frequencies including means comprising a generator of pilot waves of different frequencies lying within said broad frequency band for regulating transmission in said system, a variable frequency oscillator for applying to said system signals varying in frequency over a band comparable to said broad frequency band, a device for sweeping the frequency of said oscillator through said comparable band, means for activating said device to vary the frequency of said oscillator at a uniform time-rate through said comparable band, and means operated by test signals transmitted in said system for measuring an electrical characteristic thereof, and means responsive to test signals having frequencies lying in the frequency regions of said pilot frequencies and coupled to said device for modifying the activation thereof in such manner as to vary the frequency of said oscillator at a time-rate which is increased relative to said uniform time-rate and thereby nullify the tendency of said last-mentioned test signals to augment the pilot-wave regulation of said system, on each occasion the frequency of said oscillator is swept through said comparable band.

11. The system according to claim 10 in which said responsive means comprises means for producing voltage pulses corresponding in number to the number of said pilot frequencies, said last-mentioned pulses having spacing therebetween corresponding to the spacing of said pilot frequencies in said broad frequency band, and means to couple said pulse producing means to said device for enabling said voltage pulses to modify the activation thereof in such manner as to vary the frequency of said oscillator at the higher time-rate.

12. A broad band signal transmission system including automatic signal transmission regulating equipment selectively controlled by a pilot wave transmitted through said system at a frequency within said broad band, means to supply test oscillations to said system for transmission therethrough, means to sweep the frequency of said oscillations cyclically over at least a major part of said band embracing the frequency of said pilot wave, means to accelerate intermittently the sweep of said oscillations to a rate which, over a narrow band embracing said pilot frequency, is many times faster than the time-rate of the sweep of said oscillations elsewhere in said test oscillation band whereby the effect of said oscillations on said transmission regulating equipment is substantially eliminated, and receiving means responsive to the test oscillations transmitted through said system.

13. In combination, a voltage control variable frequency oscillator, a source of periodical sawtooth voltage connected to said oscillator to sweep the frequency thereof over a predetermined broad band, at least one network tuned to be anti-resonant to a frequency within said band and connected to said oscillator whereby said network produces a voltage corresponding to the frequency for which it is anti-resonant, means to derive a corresponding periodical voltage pulse from said last-mentioned voltage, and means to apply said pulse to said oscillator concurrently with said sawtooth voltage to accelerate the frequency sweep of said oscillator in the immediate vicinity of said frequency to which said network is anti-resonant.

14. A system for transmitting intelligence over broad band of frequencies comprising repeaters for regulating transmission in said system, means for generating pilot waves of different frequencies equivalent to frequencies in said intelligence band, equipments responsive to said pilot waves for controlling said repeaters, said equipments including filters individual to each repeater for selecting pilot waves of at least one frequency, each filter being provided with a pass-band of predetermined frequency width, an oscillator for applying test signals of variable frequency to said system, means to generate a sawtooth voltage at a preselected cyclical rate for energizing said oscillator to sweep periodically the test signals at a normal time-rate through a frequency band co-extensive with a part or all of said intelligence frequency band, means operated by the test signals transmitted in said system for measuring a preselected electrical characteristic thereof, and means for skipping the test signals through preselected different frequency bands, each having a middle frequency equivalent to the frequency of one of said pilot waves and extending to a predetermined frequency above and below said middle frequency, also each of said preselected frequency bands being many times wider than said filter pass-bands, a plurality of frequency selective networks each being anti-resonant to a frequency which lies in proximity of the lower edge of one of said preselected frequency bands, means responsive to voltages corresponding to the frequencies at which said networks are anti-resonant to produce a group of voltage pulses each time said oscillator is swept by said sawtooth voltage through said co-extensive frequency band, said pulses corresponding in number to the number of said pilot frequencies and having substantially vertical leading edges of uniform length, and means for adding said group of voltage pulses to the voltage of each cycle of said sawtooth voltage to constitute a stepped sawtooth voltage, each step corresponding to the frequency at which one of said networks is anti-resonant thereby being related to one of said pilot frequencies, also each step having said vertical leading edge energizing said oscillator to sweep said test signals through one of said preselected frequency bands at a time-rate which is increased to the order of 100 times faster than the normal time-rate sweep of the other test signal frequencies, the energy corresponding to said skipped test signal frequency bands being available to the pass-bands of said pilot filters for a time interval which is reduced to the order of $\frac{1}{100}$ as long as the time interval corresponding to the normal time sweep of other test signal frequencies so that the amount of said last-mentioned test signal energy passing through said pilot filters tends to augment the pilot-wave response of said repeater-control equipments to a negligible degree.

References Cited in the file of this patent
UNITED STATES PATENTS 2,669,691     Edmonds _____ Feb. 15, 1954